April 18, 1950     F. H. E. READ ET AL     2,504,278
AUTOMATIC HUMIDITY CONTROL SYSTEM
Filed April 19, 1948                           2 Sheets-Sheet 2
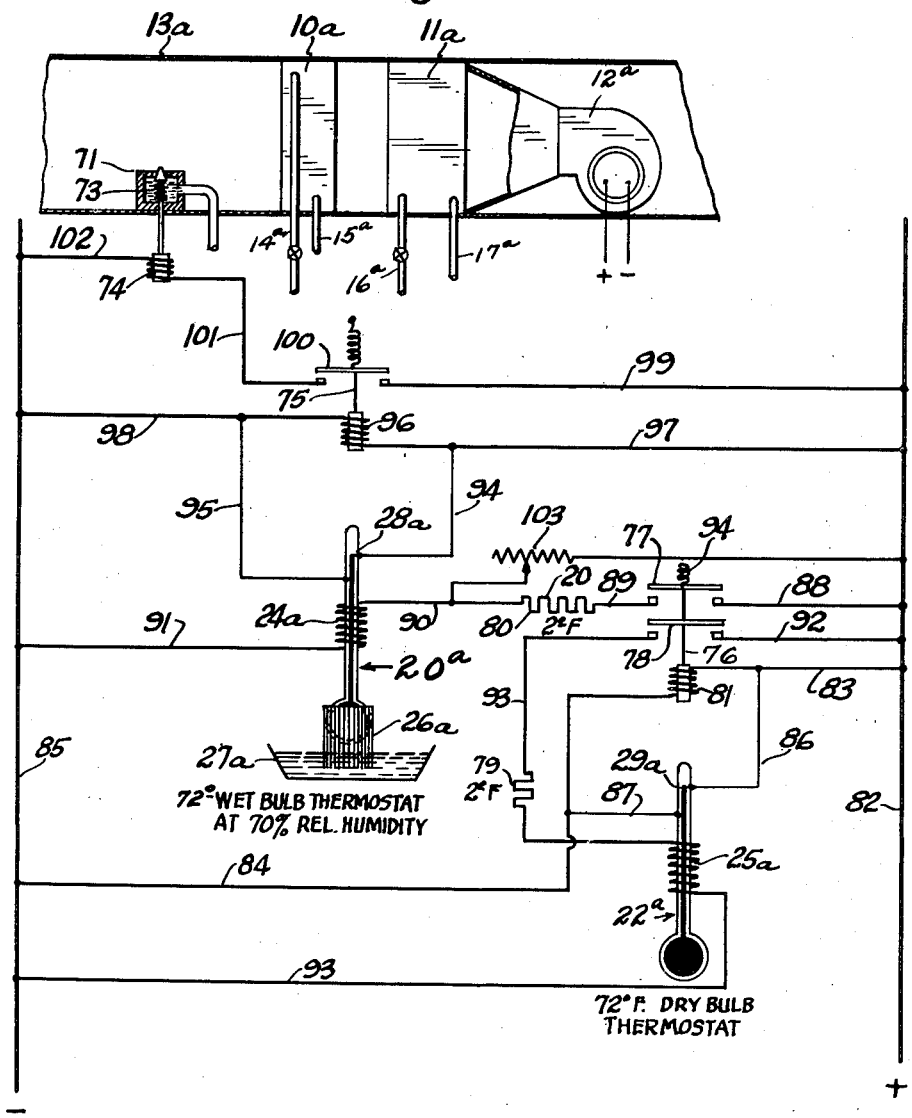
INVENTORS
Frederick Henry Evelyn Read
and
William M. Smith
By Harvey M. Gillespie
Attorney Patented Apr. 18, 1950

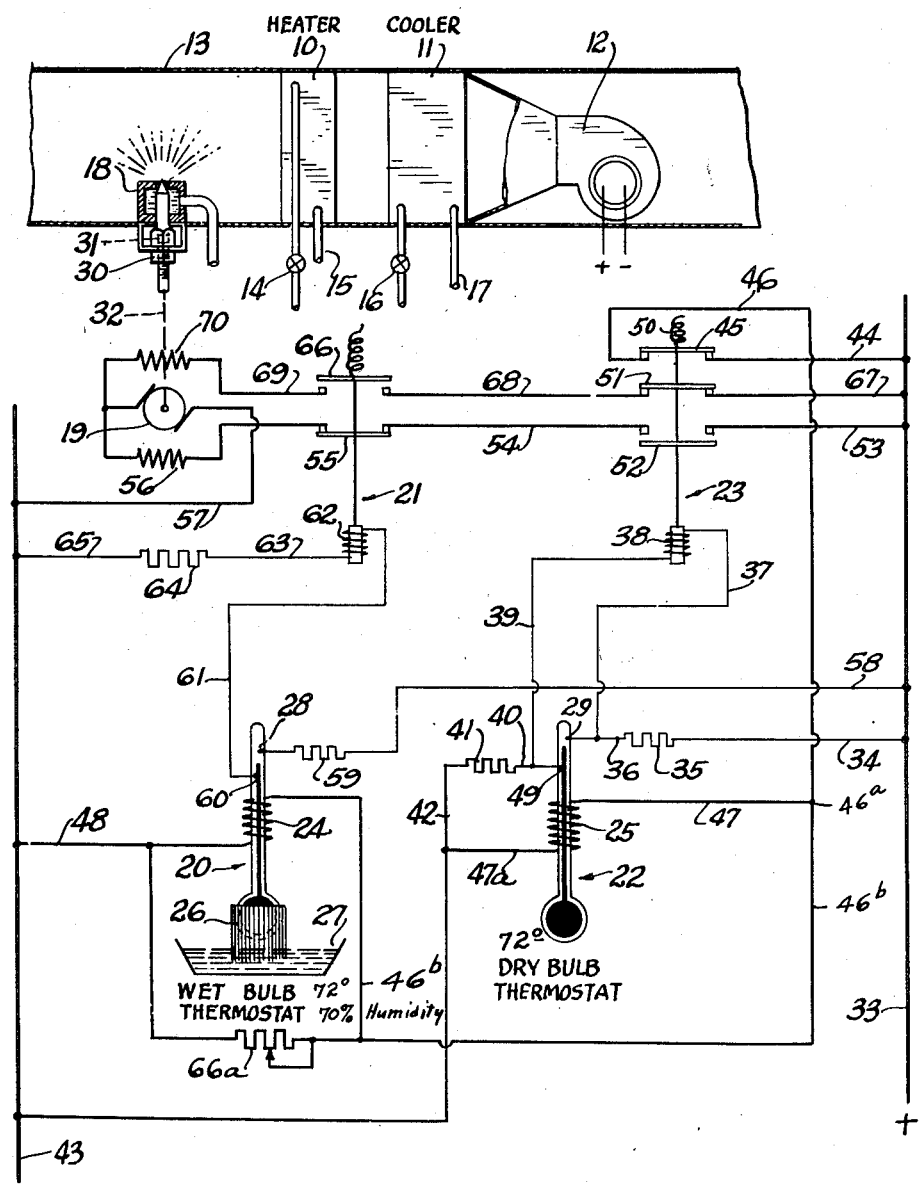

2,504,278

UNITED STATES PATENT OFFICE 2,504,278

AUTOMATIC HUMIDITY CONTROL SYSTEM

Frederick Henry Evelyn Read, Bulawayo, Southern Rhodesia, and William M. Smith, Wheaton, Ill., assignors to Vapor Heating Corporation, Chicago, Ill., a corporation of New Jersey Application April 19, 1948, Serial No. 21,774
In Great Britain April 30, 1947

8 Claims. (Cl. 236—44)

1

This invention relates to an improved control system for automatically controlling the relative humidity of the atmosphere within an enclosed space.

A principal object of the invention is to provide an improved system of the above character which will respond to departures from a predetermined comfort temperature within an enclosed space, to wit, the combined effects of temperature and humidity of the atmosphere within the space, to increase or decrease the amount of water sprayed into the atmosphere of the space and thereby restore the comfort temperature thereof to the predetermined setting.

According to the principles of the present invention, the relative humidity of the atmosphere within the space may be maintained at a predetermined setting, by spraying variable amounts of water into the atmosphere within the space or into heated or cooled streams of air forced into the space. These variable amounts of water may be delivered by means of a continuously operating spray device in which the volume of water is varied, or by means of a spray device metered to deliver a uniform volume of water, but operated intermittently for time periods of different durations.

The invention is illustrated herein in connection with an apparatus for delivering streams of heated and/or cooled air into the enclosed space. Such apparatus may be of any approved construction. The control system herein shown does not affect the operation of the heating and cooling means above referred to, but functions to control the amount of water delivered into the air stream so that the relative humidity of the atmosphere, for different dry bulb temperatures, will provide a substantially constant temperature of predetermined comfort value. The control means shown herein preferably includes a dry bulb thermostat and a wet bulb thermostat, the latter of which is under the control of the dry bulb thermostat. Both thermostats are provided with auxiliary heaters which are electrically energized to apply heat to both thermostats when the dry bulb thermostat functions to open its contacts, that is to say when the temperature at the dry bulb falls below a predetermined point. The opening and closing of the dry bulb thermostat contacts, therefore, produces a cycling operation of the auxiliary heaters and consequently of the thermostats until the proper amount of humidity is delivered into the atmosphere of the dry bulb temperature to produce a comfort temperature of predetermined value. For example, when a

2 predetermined relative humidity is obtained, both thermostats will make and break their contacts in unison and the water spray device will not be affected, since the air contains sufficient water to maintain the unison or balanced operation. In the event of any deviation of the comfort temperature from the desired value, for example any rise or fall of the dry bulb temperature relative to the reading of the wet bulb thermostat or any rise or fall of the wet bulb thermostat relative to the reading of the dry bulb thermostat, results in producing unequal responses of the thermostats. These unequal responses are utilized, preferably through the operation of a relay for controlling an energizing circuit for the spray device, to increase or decrease the amount of water delivered into the air until the wet bulb and dry bulb thermostats are again brought into balance by re-establishing the relative humidity necessary to provide the desired comfort temperature value.

The invention is illustrated in two specific embodiments wherein:

Fig. 1 is a diagrammatic illustration of the invention in which a motorized spray device is adjusted from time to time to vary the output of the spray, and Fig. 2 is a diagrammatic illustration of a modified embodiment in which the spray device is metered to deliver a substantially constant volume of water, but is intermittently operated for time periods of varying duration to vary the amount of water delivered into the atmosphere.

Referring first to Fig. 1 of the drawing: The heating and cooling apparatus is shown as comprising an air heating element 10, an air cooling element 11 and an impeller 12 for blowing air through the elements 10 and 11. This air is conducted into the temperature controlled, enclosed space by means of a suitable conduit having a series of outlets 13 for delivering the air at different locations.

The heating element 10 may be of any suitable construction adapted to receive a heating medium from a supply pipe 14, the said medium being discharged from the heater through outlet pipe 15. The cooling element 11 is provided with inlet and discharge pipes 16 and 17, whereby a suitable coolant may be circulated through the element 11. The heating and cooling elements may be operated independently or conjointly, depending upon the temperature and humidity desired. If the humidity of the air delivered by the impeller 12 is too high, the cooler 11 may be operated at a suitable temperature to condense a larger portion of the moisture. The air may be there-after reheated to the desired dry bulb temperature and after being humidified is delivered by conduit 13 into the enclosed space.

The humidity control system comprises a spray device 18, an electrically energized device 19, for example a reversible motor, for operating the spray device 18, a wet bulb thermostat 20 and an associated relay 21 controlled thereby for controlling the operation of the spray actuating means 19, and a dry bulb thermostat 22 and an associated relay 23 for controlling the cyling operation, hereinafter described, of the wet bulb thermostat 20.

The thermostats 20 and 22 may be of any type which can be made to "cycle." However, for the purpose of the present disclosure, both thermostats are of the mercury column type provided, respectively, with electrically energized auxiliary heaters 24 and 25; the heaters being energized through a common circuit and are adapted, when energized, to bias the thermostats, toward their circuit closing positions. The thermostat 20 is provided with a wick 26 which dips into a water vessel 27. The evaporation of the moisture in the wick imparts a cooling effect to the thermostat 20 in relation to the rate of evaporation. Consequently, the said thermostat measures the wet bulb temperature of the enclosure. The other thermostat 22 measures the dry bulb temperature of the enclosure. The temperature settings of the said thermostats are such that, when no auxiliary heat is applied, they will function simultaneously in response to the combined effects of a predetermined temperature and a predetermined percentage of humidity. In other words, the dry bulb thermostat 22 is set to function at a predetermined dry bulb temperature, for example, 72° Fahrenheit, and the wet bulb thermostat 20 is set to function at the same temperature, 72° Fahrenheit, when the relative humidity of the atmosphere stands at 70%. As long as the humidity stands at 70%, both thermostats will make and break their upper contacts 28 and 29 simultaneously. However, any change in the amount of humidity in the atmosphere of the enclosure, or any change in the dry bulb temperature will alter the positions of the mercury columns with relation to each other. For example, if the relative humidity of the air rises above 70%, there will be less evaporation of moisture at the wick 26 and, therefore, less cooling effect on the thermostat 20. Consequently the mercury column of this thermostat will engage its upper contact 28 before the mercury column of thermostat 22 engages its upper contact 29 and, therefore, will remain closed for a longer period of time than the thermostat 22. If the relative humidity of the atmosphere falls below said 70%, there will be a higher rate of evaporation at the wick 26 and, therefore, greater cooling effect on the thermostat 20. This condition will depress its mercury column relative to the position of the mercury column of thermostat 22, whereby the mercury column of thermostat 22 will close its contact slightly before the functioning of thermostat 20 and, therefore, will remain closed for a longer period of time than the thermostat 20.

The above deviation of the thermostats 20—22 is utilized to vary the operation of the spray device 18 so as to alter the amount of water sprayed into the air delivered into the enclosed space. For the purpose of simplifying the disclosure, the said spray device is shown as comprising a valve 30 which is held against rotation in the spray device body, but is reciprocated into and out of its port closing position. The valve may be reciprocated by means of a threaded engagement 31 with a shaft 32 of the reversible motor 19. It will be seen, therefore, that when the motor 19 rotates in one direction, the valve 30 will be moved toward its closed position to reduce or shut off the discharge of water from the spray device 18. When the motor 19 is operated in the reverse direction, the valve is moved away from its closed position so as to increase the discharge of water from the spray device.

The directional operation of the motor 19 is determined by the position of the relays 21 and 23, which relays, it will be observed are controlled by the thermostats 20 and 22. The relative position of the mercury columns of the thermostats are shown to be such that the mercury column of thermostat 22 will engage its upper contact 29 slightly before the mercury column of thermostat contact 20 will engage its contact 28. This condition of the system indicates that the humidity of the atmosphere is higher than is required to maintain the desired relative humidity. Consequently the closing of the said thermostat 22 will direct an electric current through motor 19 in a direction to impart a closing movement to the spray device valve 30 and thereby reduce the amount of moisture delivered into the air current in the conduit 13.

The electric circuits through the motor 19 are now open and the relay 23 is energized. This energizing circuit leads from positive line 33 through wire 34, resistance 35 and wires 36 and 37 to a relay actuating coil 38 and thence through wire 39, 40, resistance 41 and wire 42 to the negative line 43. The above energized position of relay 23 closes a heating circuit through the auxiliary heaters of both thermostats. The circuit leads from positive line 33 through wire 44, closed top contact 45 of relay 23, wire 46, 47, auxiliary heater 25 and thence through wire 47a and wire 42 to the negative line. The heating circuit for heater 24 follows the same circuit to terminal 46a and thence through wire 46b to heater coil 24, and thence through wire 48 to the negative line 43. Both heaters 24 and 25 apply equal amounts of heat to the thermostats and consequently do not alter the relative positions of the mercury columns, but merely bring about cycling or momentary functioning of the thermostat so that only momentary electric impulses are closed through the motor 19, the said momentary impulse serving to modulate the position of the valve 30 by a step by step operation until it reaches the desired position to deliver only the required amount of moisture into the air stream.

When the mercury column of thermostat 22 engages its upper contact 29, the electric current flows through the mercury column from contact 29 to the lower contact 49 and thereby deenergizes the relay coil 38, whereupon a spring 50 functions to open the contacts 45 and 51 of the relay and to close the contact 52. In this position of the relay 23, the auxiliary heater circuit is opened and a momentary circuit is established through the motor 19 to operate the motor in a direction to partially close the spray valve 30. This circuit leads from positive line 33, through wire 53, closed lower contact 52 of relay 23, wire 54 and closed lower contact 55 of relay 21 through motor field 56, motor armature and wire 57 to the negative line 42.

The above motor circuit will be maintained only momentarily, since the de-energization of the relay 23 opened the auxiliary heater circuits and thereby permitted both thermostats to cool. This cycle of operation will continue until the spray device delivers only sufficient moisture into the air stream to maintain the desired relative humidity.

If conditions are so changed that the mercury column of thermostat 20 engages its upper contact in advance of the closing of thermostat 22, such condition indicates that the moisture being discharged by spray device 18 is insufficient to maintain the desired relative humidity. Consequently, the advance closing of thermostat 20 closes an energizing circuit through relay 21. This circuit leads from positive line 33 through wire 58, resistor 59, contact 28, through mercury column of thermostat 20 to its lower contact 60, wire 61 to actuating coil 62 of relay 21, and thence through wire 63, resistance 64 and wire 65 to the negative line 43. The energization of the relay 21 closes contact 66 thereof and thereby closes an operating circuit through motor 19 to operate it in a direction to impart an opening movement to spray valve 30. This motor energizing circuit leads from the negative line 33 through wire 67, closed contact 51 of relay 23, wire 68, closed contact 66 of relay 21, wire 69, motor field 70, and thence through the motor armature and wire 57 to the negative line 43. This motor energizing circuit is closed only momentary, since as soon as the thermostat 22 makes contact, the relay 23 is released to open the motor circuit. The releasing of the relay 23 also deenergizes the auxiliary heaters 24 and 25 so that the mercury columns of both thermostats will again recede below their upper contacts. This cycling action will continue until the spray device has been adjusted to deliver sufficient moisture into the air stream to re-establish the desired relative humidity and thereby bring the thermostats 20 and 22 into balanced relation.

From the above disclosure, it will be observed that so long as the two thermostats remain in balance, there is no adjustment of the spray device, but when the thermostats are out of balance, the motor 19 is energized by the closing of either thermostat.

Under ideal conditions and if the differentials and time constants of the thermostats were perfectly matched, the duration of the motor operating pulses might be assumed to be a function of the deviation of the humidity. The rate of control could then be said to be modulated, i. e. the motor would move at a rate dependent upon the degree of correctional action required. However, this effect would only be obtained for small deviations of humidity and its practical value is uncertain. If the characteristics of the thermostats differ appreciably, the wet-bulb thermostat 20 may maintain a continuously closed or open circuit throughout each cycle under all conditions. The motor would then at all times receive pulses of equal duration in one direction or the other and, when stability was approached, the humidity would tend to vary slowly about a mean value.

Adjustment of the humidity value to be maintained may be provided for by connecting a variable resistance 66a, permanently shunt in with the bias winding 24 of the wet bulb thermostat 20 only. The current through this resistance 66a provides the said thermostat with means for adjusting its functional setting and widen the difference between its temperature setting and that of the dry-bulb thermostat.

If the variations of dry-bulb temperature are inconsiderable, as in normal air-conditioning systems, it may be assumed that constant wet-bulb depression implies constant relative humidity and that synchronization of the thermostats 20 and 22 indicates attainment of the required humidity value. Where, on the other hand, the variation of the dry-bulb temperature is considerable, as in evaporative cooling systems, wet-bulb depression may not give a true indication of relative humidity and compensation may therefore be necessary. With constant humidity, the depression varies proportionately with the dry-bulb temperature. The effectiveness of the periodical bias varies inversely with the said temperature and it is accordingly possible to compensate for such variation in depression by means of the variable resistance 66a connected across the bias winding 24 of the wet bulb thermostat 20. The said resistance thus acts to adjust the setting of the wet-bulb thermostat 20 in relation to that of the dry-bulb thermostat 22 and to thereby cancel the effect of diminishing wet-bulb depression.

The alternative embodiment of the invention, as shown in Fig. 2, comprises a spray device 71 positioned in the air conduit 13a substantially as shown in Fig. 1. This spray device, however, is metered to deliver a fixed volume of water into the air stream. A valve 72, normally closed by a spring 73, is opened by the energization of a solenoid 74. This solenoid is energized by the closing of a relay 75, the latter of which is under the control of a wet bulb thermostat 20a. The wet bulb thermostat 20a is preferably the same as thermostat 20 of Fig. 1. The associated parts, therefore, are indicated by the same reference characters with the exponent a. A dry bulb 22a controls the operation of a relay 76 and in this way controls the cycling operation of the wet bulb 20a by opening and closing a heating circuit through auxiliary heater 24a. The energizing circuit for the auxiliary heater 24a of wet bulb thermostat is connected through upper contact 77 of relay 76. The auxiliary heater 25a of dry-bulb thermostat 22a is connected through the lower contact 78 of the relay 76. It will be observed, therefore, that the said thermostats 20a and 22a are connected in parallel, but inasmuch as both heaters are supplied with equal amounts of heat through cycle resistors 79—80 and are simultaneously energized, the said heaters, if desired, may be connected in series.

It will be seen by inspection of Fig. 2 that the dry-bulb thermostat 22a is connected in a shunt circuit around the operating coil 81 of relay 76. The operating circuit for said relay coil 81 leads from the positive line 82 through wire 83, relay operating coil 81 and wire 84 to the negative line 85. The said shunt circuit comprises wires 86 and 87 which lead from the upper and lower contacts, respectively, of thermostat 22a to the positive and negative sides of the coil 81. When the mercury column of the dry-bulb thermostat 22a stands below its upper contact the relay 76 is energized by virtue of the operating circuits 82, 83, 81, 84 and 85. The energization of the relay 76 closes heating circuits through both auxiliary heaters 24a and 25a. The heater circuit through auxiliary heater 24a leads from the positive line 82 through wire 88, through closed contact 77 of relay 76, wire 89, cycle resistor 80, wire 90 to the auxiliary heater 24a, and thence through wire 91 to the negative line 85. The heating circuit for auxiliary heater leads from the positive line 82 through wire 92, contact 78 of relay 76, wire 93, cycle resistor 79 to coil 25a, thence through wire 93 to the negative line 85.

The manner in which the dry-bulb 22a controls the functioning of the wet bulb thermostat 20a will be readily understood from the following description. In this connection it is to be assumed that the normal setting of the thermostats are the same as in the previous embodiment. For example, the dry-bulb is set to normally function at 72° Fahrenheit. When the mercury column of thermostat 22a engages its upper contact the current flows through the shunt circuit 86, 87 and thereby de-energizes the coil 81, whereupon the spring 94 moves the relay 76 to its open position. The wet bulb thermostat 20a is set to function at the same temperature (72° Fahrenheit) when the relative humidity within the enclosed space stands at 70%. As long as the relative humidity of the space remains at 70%, both thermostats will break their contacts simultaneously. However, any change in the amount of humidity in the atmosphere of the enclosed space will alter the position of the mercury column of the wet thermostat 20a relative to the mercury column of the thermostat 22a, since any change in the amount of humidity in the atmosphere will alter the rate of evaporation of water from the moist wick 26a of the wet bulb thermostat and, therefore, alter the cooling effect on the wet bulb thermostat. For example, if the relative humidity of the air rises above 70%, there will be less evaporation of moisture at the wick 26a and, therefore, less cooling effect on the wet bulb thermostat. Consequently the mercury column of this thermostat will engage its upper contact 28a before the mercury column of the dry-bulb thermostat 22a engages its upper contact 29a. If the relative humidity of the atmosphere falls below 70% there is more evaporation at the moist wick 26a and, therefore, greater cooling effect on the wet thermostat 20a. This greater cooling effect serves to depress the mercury column of the wet thermostat relative to the position of the mercury column of the dry-bulb thermostat. In such case, the dry-bulb thermostat mercury column will engage its contact 29a slightly before the mercury column of the wet bulb thermostat 20a engages its upper contact 28a. However, as soon as thermostat 22a closes its upper contact, the relay 76 is de-energized so as to open the heater circuits to both thermostats, thereby permitting the mercury columns of both thermostats to recede from their upper contacts. However, as soon as the mercury column of the wet bulb thermostat 20a recedes below its upper contact 28a the shunt circuit, composed of wires 94 and 95, is broken and thereby permit an energizing current to pass through the actuating coil 96 of relay 75. The energization of this relay closes a circuit through the spray valve solenoid 74 and thereby opens the valve to deliver a spray of water into the air current in conduit 13a.

The energizing circuit for said relay 75 leads from the positive line 82 through wire 97 to relay actuating coil 96, and thence through wire 98 to the negative line 85. The energizing circuit for the spray device 72 leads from the positive line 82 through wire 99, closed contact 100 of relay 75, wire 101, spray solenoid 74 and wire 102 to the negative line.

When the spray device is operated to increase the humidity, the duration of said operation varies in relation to the extent of the depression of the mercury column of the wet thermostat 20a relative to the mercury column of the dry thermostat 22a. The spray is set into operation, as previously indicated, by breaking the contact of the wet bulb thermostat 20a, but this operation is interrupted as soon as the dry-bulb thermostat 22a breaks contact, since the breaking of the dry-bulb thermostat contact removes the auxiliary heat from both of the thermostats. If the depression of the wet bulb thermostat relative to the dry-bulb thermostat is relatively small, a spray operation will be of short duration, but of frequent occurrence, since the cycling of the thermostats by the addition and removal of the auxiliary heat will be more frequent.

If the depression of the wet bulb mercury column is substantial relative to the mercury column of the dry-bulb thermostat, the spray device will remain operative for a longer period of time and thereby deliver a larger amount of water into the air stream.

When the unbalanced condition of the thermostats results from an increase of relative humidity above 70%, the mercury column of the wet bulb thermostat 20a will rise above its normal position relative to the mercury column of the dry-bulb thermostat 22a. Consequently this mercury column will engage the upper contact 28a so as to interrupt the operation of the spray device 72 before the mercury column of the dry-bulb thermostat engages its upper contact 29a. When the relay 76 is thus de-energized and the auxiliary heat is removed from both thermostats, the thermostats will normally cool at an equal rate and consequently the mercury column of the wet bulb thermostat will break contact after the contact is broken at the dry-bulb thermostat. If the unbalanced condition of the thermostats is substantial, the auxiliary heat may be re-applied to the wet thermostat before it breaks contact. In such case, the spray device 72 will remain inoperative until the surplus humidity is removed from the air stream by operation of the condenser 11 or by increasing the temperature of the air.

The auxiliary heaters for both thermostats, as previously indicated, normally apply equal amounts of heat to the thermostats when the relay 76 is closed. However, in order to permit adjustment of the wet bulb thermostat 20a so as to vary its relative humidity setting, the auxiliary heater for this thermostat may be supplied with a predetermined amount of heating current through the manually variable resistor 102.

We claim:

1. An automatic system for controlling the humidity of the atmosphere within an enclosed space comprising a spray device for spraying water into said atmosphere, an electrically energized means for operating said spray device, means for controlling the operation of said spray operating means comprising an electrically energized relay for closing an electrical impulse through said spray operating means, a thermostat responsive to the wet bulb temperature of said atmosphere for controlling the energization of said relay, an electrical auxiliary heater for said thermostat, and means including a second thermostat responsive to the dry bulb temperature of said atmosphere for energizing said auxiliary heater, whereby an unbalanced relationship of the thermostats determines the duration of said electrical impulse through said spray operating means.

2. An automatic system for controlling the humidity of the atmosphere within an enclosed space comprising a spray device for spraying water into said atmosphere, an electrically energized means for operating said spray device, means for controlling the operation of said spray operating means comprising an electrically energized relay for closing an electrical impulse through said spray operating means, a thermostat responsive to the wet bulb temperature of said atmosphere and set to function at a predetermined temperature at a predetermined relative humidity for controlling the energization of said relay, an electrical auxiliary heater for said thermostat, and means including a second thermostat responsive to the dry bulb temperature of said atmosphere for energizing said auxiliary heater and set to function at the same dry bulb temperature as the first mentioned thermostat, whereby an unbalanced relationship of the thermostats determines the duration of said electrical impulse through said spray operating means.

3. An automatic system for controlling the humidity of the atmosphere within an enclosed space comprising a spray device for spraying water into said atmosphere, an electrically energized means for operating said spray device, means for controlling the operation of said spray operating means comprising an electrically energized relay for closing an electrical impulse through said spray operating means, a thermostat responsive to the wet bulb temperature of said atmosphere and set to function at a predetermined temperature at a predetermined relative humidity for controlling the energization of said relay, an electrical auxiliary heater for said thermostat, a second relay for closing an energizing circuit through said auxiliary heater, and means including a second thermostat responsive to the dry bulb temperature of said atmosphere for controlling the energization of said second relay, whereby an unbalanced relationship of the two thermostats determines the duration of said electrical impulse through said spray operating means.

4. An automatic system for controlling the humidity of the atmosphere within an enclosed space comprising a spray device for spraying water into said atmosphere, an electrically energized means for operating said spray device, means for controlling the operation of said spray operating means comprising an electrically energized relay for closing an electrical impulse through said spray operating means, a thermostat responsive to the wet bulb temperature of said atmosphere and set to function at a predetermined temperature at a predetermined relative humidity for controlling the energization of said relay, a second relay, a thermostat responsive to the dry bulb temperature of said atmosphere for controlling the energization of said second relay, and electrical auxiliary heaters for both thermostats connected through said second relay, whereby both thermostats are cycled by the opening and closing the second relay and whereby the duration of said electrical impulse through the spray operating means varies in relation to the extent of the unbalanced position of one thermostat relative to the other.

5. An automatic system for controlling the humidity of the atmosphere within an enclosed space comprising a spray device for spraying water into said atmosphere, an electrically energized means for operating said spray device, means for controlling the operation of said spray operating means comprising an electrically energized relay for closing an electrical impulse through said spray operating means, a thermostat responsive to the wet bulb temperature of said atmosphere and set to function at a predetermined temperature at a predetermined relative humidity for controlling the energization of said relay, a second relay, a thermostat responsive to the dry bulb temperature of said atmosphere for controlling the energization of said second relay, electrical auxiliary heaters for both thermostats connected through said second relay, whereby both thermostats are cycled by the opening and closing of the second relay and whereby the duration of said electrical impulse through the spray operating means varies in relation to the extent of the unbalanced position of one thermostat relative to the other, and a manually variable resistor connected in the auxiliary heater circuit for the first mentioned thermostat to adjust its functional setting relative to the functional setting of the second thermostat.

6. An automatic system for controlling the humidity of the atmosphere within an enclosed space comprising a spray device including a valve adapted to be variably positioned to vary the volume of water discharged into said atmosphere, a reversible electric motor for altering the position of the valve in accordance with the direction of rotation of the motor, a pair of relays cooperatively interposed in the forward and reverse electric circuit of the motor and normally maintained in opposite positions, and means including a wet bulb thermostat and a dry bulb thermostat having balanced functional settings for controlling the energization of said relays, one of said thermostats being adapted, upon closing its contact, to energize its relay and the other thermostat being adapted upon closing its contact to de-energize its relay whereby, when said thermostats function in balanced unison, they are ineffective to complete a circuit through said motor, but are effective, when out of balance, to close an operating circuit through said motor.

7. An automatic system for controlling the humidity of the atmosphere within an enclosed space comprising a spray device including a valve adapted to be variably positioned to vary the volume of water discharged into said atmosphere, a reversible electric motor for altering the position of the valve in accordance with the direction of rotation of the motor, a pair of relays cooperatively interposed in the forward and reverse electric circuit of the motor and normally maintained in opposite positions, and means including a wet bulb thermostat and a dry bulb thermostat having balanced functional settings for controlling the energization of said relays, one of said thermostats being adapted, upon closing its contact, to energize its relay and the other thermostat being adapted upon closing its contact to de-energize its relay whereby, when said thermostats function in balanced unison, they are ineffective to complete a circuit through said motor, but are effective, when out of balance, to close an operating circuit through said motor, and means for simultaneously applying equal amounts of auxiliary heat to both of said thermostats so as to produce cycling operations.

8. An automatic system for controlling the humidity of the atmosphere within an enclosed space comprising a spray device including a valve adapted to be variably positioned to vary the volume of water discharged into said atmosphere, a reversible electric motor for altering the position of the valve in accordance with the direction of rotation of the motor, a pair of relays cooperatively interposed in the forward and reverse electric circuit of the motor and normally maintained in opposite positions, and means including a wet bulb thermostat and a dry bulb thermostat having balanced functional settings for controlling the energization of said relays, one of said thermostats being adapted, upon closing its contact, to energize its relay and the other thermostat being adapted upon closing its contact to de-energize its relay whereby, when said thermostats function in balanced unison, they are ineffective to complete a circuit through said motor, but are effective, when out of balance, to close an operating circuit through said motor, means for simultaneously applying equal amounts of auxiliary heat to both of said thermostats so as to produce cycling operations, and means comprising a manually variable resistance interposed in the heating circuit of the wet bulb thermostat, whereby the relative humidity setting may be varied.

FREDERICK HENRY EVELYN READ.
WILLIAM M. SMITH.

REFERENCES CITED

The following references are of record in the file of this patent:

UNITED STATES PATENTS

| Number | Name | Date |
|---|---|---|
| 1,270,747 | Santos | June 25, 1918 |
| 1,382,956 | Cramer et al. | June 28, 1921 |